(12) United States Patent
Lu

(10) Patent No.: US 11,132,996 B2
(45) Date of Patent: Sep. 28, 2021

(54) METHOD AND APPARATUS FOR OUTPUTTING INFORMATION

(71) Applicant: Baidu Online Network Technology (Beijing) Co., Ltd., Beijing (CN)

(72) Inventor: Yongshuai Lu, Beijing (CN)

(73) Assignee: BAIDU ONLINE NETWORK TECHNOLOGY (BEIJING) CO., LTD., Beijing (CN)

( * ) Notice: Subject to any disclaimer, the term of this patent is extended or adjusted under 35 U.S.C. 154(b) by 208 days.

(21) Appl. No.: 16/593,678

(22) Filed: Oct. 4, 2019

(65) Prior Publication Data

US 2020/0286470 A1 Sep. 10, 2020

(30) Foreign Application Priority Data

Mar. 5, 2019 (CN) .......................... 201910162566.7

(51) Int. Cl.
*G10L 15/00* (2013.01)
*G10L 15/18* (2013.01)
(Continued)

(52) U.S. Cl.
CPC .......... *G10L 15/187* (2013.01); *G09B 17/006* (2013.01); *G10L 15/005* (2013.01); *G10L 15/22* (2013.01); *G10L 25/51* (2013.01)

(58) Field of Classification Search
None
See application file for complete search history.

(56) References Cited

U.S. PATENT DOCUMENTS 8,428,951 B2 * 4/2013 Hyakumoto ....... G01C 21/3608
704/255
9,548,052 B2 * 1/2017 King ....................... G10L 15/22
(Continued)

FOREIGN PATENT DOCUMENTS

CN 1450445 A 10/2003
CN 102043774 A 5/2011
(Continued)

OTHER PUBLICATIONS

Feng, Z., "Theory and Method for Formal Analysis of Natural Language by Computer" with English abstract, University of Science and Technology of China Press, Jan. 2017, p. 795.
(Continued)

Primary Examiner — Satwant K Singh
(74) Attorney, Agent, or Firm — Seed IP Law Group LLP

(57) ABSTRACT

Embodiments of the present disclosure relate to a method and apparatus for outputting information. The method includes: outputting a to-be-read audio in response to receiving a reading instruction from a user; acquiring an actually read audio obtained by reading the to-be-read audio by the user; performing speech recognition on the actually read audio to obtain a recognition result; calculating a similarity between the actually read audio and the to-be-read audio based on a character string corresponding to the recognition result and a character string corresponding to the to-be-read audio; determining, from a predetermined set of similarity intervals, a similarity interval to which the calculated similarity belongs; and outputting a reading evaluation corresponding to the determined similarity interval. The embodiment may help a reader to improve the learning efficiency and learning interest, thereby improving the rate of a user using a device.

15 Claims, 9 Drawing Sheets

100

(51) Int. Cl.
*G10L 15/187* (2013.01)
*G10L 15/22* (2006.01)
*G09B 17/00* (2006.01)
*G10L 25/51* (2013.01)

(56) References Cited

U.S. PATENT DOCUMENTS

| | | | |
|---|---|---|---|
| 9,767,793 B2* | 9/2017 | Corfield | G10L 15/07 |
| 9,799,336 B2* | 10/2017 | Dzik | G10L 15/26 |
| 2017/0323634 A1* | 11/2017 | Corfield | G10L 15/07 |

FOREIGN PATENT DOCUMENTS

| | | | |
|---|---|---|---|
| CN | 104008187 A | | 8/2014 |
| CN | 107273359 A | | 10/2017 |
| CN | 108573697 A | | 9/2018 |
| JP | 10-187185 A | | 7/1998 |

OTHER PUBLICATIONS

Zubariri et al., "Cyber Security Standards, Practices and Industrial Applications: Systems and Methodologies", 2014, 7 pages.
Qiao et al., "Research on intelligent phone number checking engine based on text similarity", Jun. 2018, 7 pages.

* cited by examiner

METHOD AND APPARATUS FOR OUTPUTTING INFORMATION

CROSS-REFERENCE TO RELATED APPLICATIONS

This application claims priority to Chinese Application No. 201910162566.7, filed on Mar. 5, 2019 and entitled "Method and Apparatus for Outputting Information," the entire disclosure of which is hereby incorporated by reference.

TECHNICAL FIELD

Embodiments of the present disclosure relate to the field of computer technology, and specifically to a method and apparatus for outputting information.

BACKGROUND

An intelligent device is a device, an instrument or a machine capable of computing and processing. In the prior art, the intelligent device may be applied to various voice reading scenarios because of a voice interaction function. As an example, voice reading may be widely applied to scenarios such as foreign language learning, stuttering correction or early childhood education.

In some cases, a reader may not be able to accurately pronounce the same audio as an audio pronounced by the intelligent device due to factors such as younger age, or the intelligent device may consider that the audio pronounced by the reader is different from the audio pronounced by the intelligent device due to an error in speech recognition. However, the intelligent device often determines whether the reader is reading seriously or whether to proceed to read a current audio based on whether the audio pronounced by the reader is the same as the audio pronounced by the intelligent device.

SUMMARY

Embodiments of the present disclosure provide a method and apparatus for outputting information.

In a first aspect, an embodiment of the present disclosure provides a method for outputting information, the method comprising: outputting a to-be-read audio in response to receiving a reading instruction from a user; acquiring an actually read audio obtained by reading the to-be-read audio by the user; performing speech recognition on the actually read audio to obtain a recognition result; calculating a similarity between the actually read audio and the to-be-read audio based on a character string corresponding to the recognition result and a character string corresponding to the to-be-read audio; determining, from a predetermined set of similarity intervals, a similarity interval to which the calculated similarity belongs; and outputting a reading evaluation corresponding to the determined similarity interval.

In some embodiments, the calculating the similarity between the actually read audio and the to-be-read audio based on the character string corresponding to the recognition result and the character string corresponding to the to-be-read audio comprises: in response to determining that the recognition result indicates the actually read audio being a Chinese audio and the to-be-read audio is an English audio or a Chinese audio, determining a phonetic character string corresponding to the to-be-read audio, and determining a phonetic character string corresponding to the recognition result; and calculating the similarity between the actually read audio and the to-be-read audio based on the phonetic character string corresponding to the to-be-read audio and the phonetic character string corresponding to the recognition result.

In some embodiments, the calculating the similarity between the actually read audio and the to-be-read audio based on the character string corresponding to the recognition result and the character string corresponding to the to-be-read audio comprises: in response to determining that the recognition result indicates the actually read audio being an English audio and the to-be-read audio is a Chinese audio, determining a phonetic character string corresponding to the to-be-read audio, and determining an English character string corresponding to the recognition result; and calculating the similarity between the actually read audio and the to-be-read audio based on the phonetic character string corresponding to the to-be-read audio and the English character string corresponding to the recognition result.

In some embodiments, the calculating the similarity between the actually read audio and the to-be-read audio based on the character string corresponding to the recognition result and the character string corresponding to the to-be-read audio comprises: in response to determining that the recognition result indicates the actually read audio being an English audio and the to-be-read audio is an English audio, determining an English character string corresponding to the to-be-read audio, and determining an English character string corresponding to the recognition result; and calculating the similarity between the actually read audio and the to-be-read audio based on the English character string corresponding to the to-be-read audio and the English character string corresponding to the recognition result.

In some embodiments, the calculating the similarity between the actually read audio and the to-be-read audio based on the character string corresponding to the recognition result and the character string corresponding to the to-be-read audio comprises: determining a length of the longest common subsequence between the character string corresponding to the to-be-read audio and the character string corresponding to the recognition result; and calculating the similarity between the actually read audio and the to-be-read audio based on the length and a length of the character string corresponding to the to-be-read audio.

In a second aspect, an embodiment of the present disclosure provides another method for outputting information, the method comprising: in response to receiving a reading instruction from a user, outputting a to-be-read audio sequence, and performing following reading steps for each to-be-read audio in the to-be-read audio sequence: outputting the to-be-read audio; acquiring an actually read audio obtained by reading the to-be-read audio by the user; performing speech recognition on the acquired actually read audio to obtain a recognition result; calculating a similarity between the acquired actually read audio and the to-be-read audio based on a character string corresponding to the recognition result and a character string corresponding to the to-be-read audio; determining, from a predetermined set of similarity intervals, a similarity interval to which the calculated similarity belongs; outputting a reading evaluation corresponding to the determined similarity interval; and in response to determining the calculated similarity being less than or equal to a preset similarity threshold, proceeding to perform the reading steps based on the to-be-read audio.

In some embodiments, the method also comprises: in response to determining the calculated similarity being greater than the preset similarity threshold, proceeding to perform the reading steps based on a to-be-read audio next to the to-be-read audio in the to-be-read audio sequence.

In a third aspect, an embodiment of the present disclosure provides an apparatus for outputting information, the apparatus comprising: a first output unit, configured for outputting a to-be-read audio in response to receiving a reading instruction from a user; an acquisition unit, configured for acquiring an actually read audio obtained by reading the to-be-read audio by the user; a recognition unit, configured for performing speech recognition on the actually read audio to obtain a recognition result; a calculation unit, configured for calculating a similarity between the actually read audio and the to-be-read audio based on a character string corresponding to the recognition result and a character string corresponding to the to-be-read audio; a determination unit, configured for determining, from a predetermined set of similarity intervals, a similarity interval to which the calculated similarity belongs; and a second output unit, configured for outputting a reading evaluation corresponding to the determined similarity interval.

In some embodiments, the calculation unit comprises: a first determination module, configured for in response to determining that the recognition result indicates the actually read audio being a Chinese audio and the to-be-read audio is an English audio or a Chinese audio, determining a phonetic character string corresponding to the to-be-read audio, and determining a phonetic character string corresponding to the recognition result; and a first calculation module, configured for calculating the similarity between the actually read audio and the to-be-read audio based on the phonetic character string corresponding to the to-be-read audio and the phonetic character string corresponding to the recognition result.

In some embodiments, the calculation unit comprises: a second determination module, configured for in response to determining that the recognition result indicates the actually read audio being an English audio and the to-be-read audio is a Chinese audio, determining a phonetic character string corresponding to the to-be-read audio, and determining an English character string corresponding to the recognition result; and a second calculation module, configured for calculating the similarity between the actually read audio and the to-be-read audio based on the phonetic character string corresponding to the to-be-read audio and the English character string corresponding to the recognition result.

In some embodiments, the calculation unit comprises: a third determination module, configured for in response to determining that the recognition result indicates the actually read audio being an English audio and the to-be-read audio is an English audio, determining an English character string corresponding to the to-be-read audio, and determining an English character string corresponding to the recognition result; and a third calculation module, configured for calculating the similarity between the actually read audio and the to-be-read audio based on the English character string corresponding to the to-be-read audio and the English character string corresponding to the recognition result.

In some embodiments, the calculation unit comprises: a fourth determination module, configured for determining a length of the longest common subsequence between the character string corresponding to the to-be-read audio and the character string corresponding to the recognition result; and a fourth calculation module, configured for calculating the similarity between the actual read-after audio and the to-be-read audio based on the length and a length of the character string corresponding to the to-be-read audio.

In a fourth aspect, an embodiment of the present disclosure provides another apparatus for outputting information, the apparatus comprising a third output unit, configured for outputting a to-be-read audio sequence in response to receiving a reading instruction from a user, and performing following reading steps for each to-be-read audio in the to-be-read audio sequence: outputting the to-be-read audio; acquiring an actually read audio obtained by reading the to-be-read audio by the user; performing speech recognition on the acquired actually read audio to obtain a recognition result; calculating a similarity between the acquired actually read audio and the to-be-read audio based on a character string corresponding to the recognition result and a character string corresponding to the to-be-read audio; determining, from a predetermined set of similarity intervals, a similarity interval to which the calculated similarity belongs; outputting a reading evaluation corresponding to the determined similarity interval; and in response to determining the calculated similarity being less than or equal to a preset similarity threshold, proceeding to perform the reading steps based on the to-be-read audio.

In some embodiments, the apparatus also comprises: a first continuing execution unit, configured for in response to determining the calculated similarity being greater than the preset similarity threshold, proceeding to perform the reading steps based on a to-be-read audio next to the to-be-read audio in the to-be-read audio sequence.

In a fifth aspect, an embodiment of the present disclosure provides a terminal device for outputting information, comprising: one or more processors; and a storage apparatus, storing one or more programs, wherein the one or more programs, when executed by the one or more processors, cause the one or more processors to implement the method according to any embodiment of the method for outputting information.

In a sixth aspect, an embodiment of the present disclosure provides a computer readable medium for outputting information, storing a computer program, wherein the program, when executed by a processor, implements the method according to any embodiment of the method for outputting information.

By executing following steps, the method and apparatus for outputting information provided by some embodiments of the present disclosure may help a reader to improve the learning efficiency and learning interest so as to improve the rate of a user using a device: outputting a to-be-read audio in response to receiving a reading instruction from a user; acquiring an actually read audio obtained by reading the to-be-read audio by the user; performing speech recognition on the actually read audio to obtain a recognition result; calculating a similarity between the actually read audio and the to-be-read audio based on a character string corresponding to the recognition result and a character string corresponding to the to-be-read audio; determining, from a predetermined set of similarity intervals, a similarity interval to which the calculated similarity belongs; and outputting a reading evaluation corresponding to the determined similarity interval.

BRIEF DESCRIPTION OF THE DRAWINGS

After reading detailed descriptions of non-limiting embodiments with reference to the following accompanying drawings, other features, objectives and advantages of the present disclosure will become more apparent.

DETAILED DESCRIPTION OF EMBODIMENTS

Embodiments of present disclosure will be described below in detail with reference to the accompanying drawings. It should be appreciated that the specific embodiments described herein are merely used for explaining the relevant disclosure, rather than limiting the disclosure. In addition, it should be noted that, for the ease of description, only the parts related to the relevant disclosure are shown in the accompanying drawings.

It should also be noted that some embodiments in the present disclosure and some features in the disclosure may be combined with each other on a non-conflict basis. Features of the present disclosure will be described below in detail with reference to the accompanying drawings and in combination with embodiments.

Figure 1:
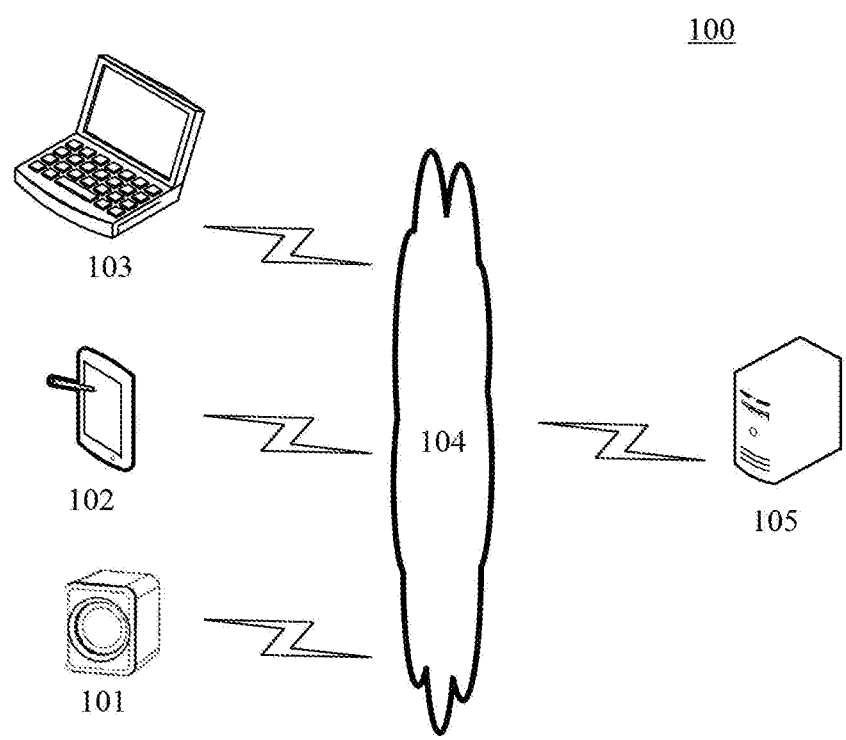
FIG. 1 is a diagram of an example system architecture in which an embodiment of the present disclosure may be implemented.

FIG. 1 shows an example system architecture 100 in which a method for outputting information or an apparatus for outputting information according to an embodiment of the present disclosure may be implemented.

As shown in FIG. 1, the system architecture 100 may include terminal devices 101, 102 and 103, a network 104, and a server 105. The network 104 serves as a medium providing a communication link between the terminal devices 101, 102 and 103 and the server 105. The network 104 may include various types of connections, such as wired or wireless communication links, or optical fibers.

A user may interact with the server 105 via the network 104 using the terminal devices 101, 102 and 103, to receive or send messages (such as a reading evaluation corresponding to a recognition result). Various client applications, such as reading software (e.g., English reading and ancient poem reading software), web browser applications, shopping applications, search applications, instant messaging tools, mailbox clients or social platform software, may be installed on the terminal devices 101, 102 and 103.

The terminal devices 101, 102 and 103 may be hardware or software. When the terminal devices 101, 102 and 103 are hardware, the terminal devices may be various electronic devices supporting voice interaction, including but not limited to an intelligent speaker, a smart phone, a tablet computer, a laptop portable computer or a desktop computer.

When the terminal devices 101, 102 and 103 are software, the terminal devices may be installed in the above-listed electronic devices. The terminal device may be implemented as a plurality of software programs or software modules (e.g., software programs or software modules for providing distributed services), or as a single software program or software module, which is not specifically limited herein.

The server 105 may provide various services, such as a backend server supporting software installed on the terminal devices 101, 102 and 103. The backend server may analyze and process received data, and generate a processing result.

It should be noted that the method for outputting information provided by some embodiments of the present disclosure is generally executed by the terminal devices 101, 102 and 103. Accordingly, the apparatus for outputting information is generally provided in the terminal devices 101, 102 and 103. However, in some cases, the method for outputting information provided by some embodiments of the present disclosure may be executed by the terminal devices 101, 102 and 103 and the server 105 together. Accordingly, respective units included in the apparatus for outputting information may be provided in the terminal devices 101, 102 and 103 and the server 105 respectively.

It should be noted that the server may be hardware or software. When the server is hardware, the server may be implemented as a distributed server cluster composed of a plurality of servers, or may be implemented as a single server. When the server is software, the server may be implemented as a plurality of software programs or software modules (such as software programs or software modules for providing distributed services), or may be implemented as a single software program or software module, which is not specifically limited herein.

It should be understood that the numbers of the terminal devices, networks and servers in FIG. 1 are merely illustrative. Any number of terminal devices, networks and servers may be provided based on actual requirements. When an electronic device on which the method for outputting information is performed does not need to transmit data with other electronic devices, the system architecture may include only the electronic device on which the method for outputting information is performed.

Figure 2:
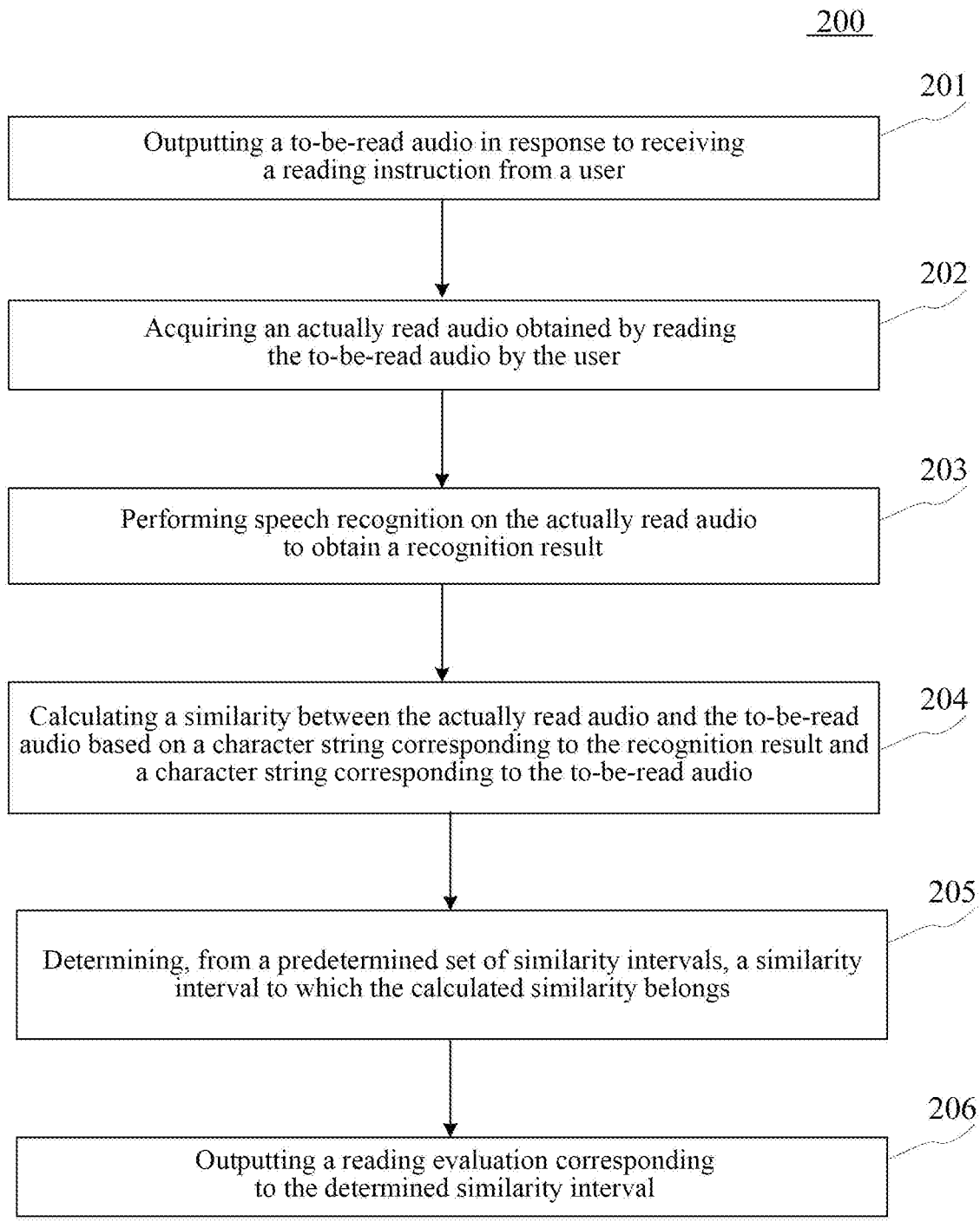
FIG. 2 is a flowchart of a method for outputting information according to an embodiment of the present disclosure.

Further, referring to FIG. 2, a flow 200 of a method for outputting information according to an embodiment of the present disclosure is shown. The method for outputting information includes following steps.

Step 201: outputting a to-be-read audio in response to receiving a reading instruction from a user.

In the present embodiment, an executing body (for example, the terminal device shown in FIG. 1) of the method for outputting information may output a to-be-read audio in response to receiving a reading instruction from a user. The user may be a user of the executing body. The reading instruction may be an instruction generated by the user by interacting with the executing body, and the reading instruction may be used to instruct the executing body to enter a reading mode (i.e., a mode in which the user repeats an audio outputted by the executing body).

Here, the reading instruction may include but not limited to an instruction generated by the user by pronouncing a voice "reading", or clicking or pressing a button for instructing to read. The to-be-read audio may be an audio to be read by various users. As an example, the to-be-read audio may be an audio in various languages (e.g., English, Japanese or French), and may also be an audio of children's songs or ancient poems.

Step 202: acquiring an actually read audio obtained by reading the to-be-read audio by the user.

In the present embodiment, the executing body may acquire an actually read audio obtained by reading the to-be-read audio acquired in step 201 by the user.

Here, after the executing body outputs the to-be-read audio, the user may read (repeat) the to-be-read audio. It may be understood that the audio pronounced by the user when reading is the actually read audio. And then, the executing body may acquire the actually read audio.

In practice, the executing body, after outputting the to-be-read audio, may determine any audio pronounced by the user as an actually read audio, thereby acquiring the actually read audio.

Step 203: performing speech recognition on the actually read audio to obtain a recognition result.

In the present embodiment, the executing body may perform speech recognition on the actually read audio to obtain a recognition result. The recognition result may be a word corresponding to the actually read audio.

Here, the executing body may perform speech recognition with following algorithms (but not limited to): DTW (Dynamic Time Warping) speech recognition algorithm, MFCC (MelFrequency Cepstrum Coefficient) speech recognition algorithm, and speech recognition algorithm based on GMM (Gauss of mixture models) and HMM (Hidden Markov Model).

In practice, the executing body may first determine a language to which the actually read audio belongs, and then generate a text of the language corresponding to the actually read audio as a recognition result. For example, if the actually read audio obtained by the executing body is audio "nihao" and the executing body determines that the actually read audio belongs to a Chinese audio, the executing body may generate a recognition result such as " 你好 ", " 拟好 " or " 倪浩 " (each of which is pronounced as "nihao").

Here, various ways may be used to determine a language to which the actually read audio belongs.

As an example, the executing body may input the actually read audio into a pre-trained language classification model to obtain a language to which the actually read audio belongs. The language classification model may be used to determine the language to which the input audio belongs. For example, the language classification model may be obtained by inputting a training sample including a sample audio and a language to which the sample audio belongs into an initial model (for example, support vector machine, naive Bayes) and then training the initial model using a machine learning algorithm.

As still another example, the executing body may also send the actually read audio to an electronic device communicatively connected thereto, and then a user of the electronic device determines the language to which the actually read audio belongs and sends a determination result to the executing body so as to determine the language to which the actually read audio belongs.

Optionally, the executing body may also determine a Chinese phonetic alphabet corresponding to the actually read audio as the recognition result. For example, if the actually read audio acquired by the executing body is "nihao", then the executing body may generate a recognition result "nihao".

Step 204: calculating a similarity between the actually read audio and the to-be-read audio based on a character string corresponding to the recognition result and a character string corresponding to the to-be-read audio.

In the present embodiment, the executing body may calculate the similarity between the actually read audio and the to-be-read audio based on a character string corresponding to the recognition result and a character string corresponding to the to-be-read audio.

The character string corresponding to the recognition result may be the recognition result itself, or may be a character string obtained by converting the recognition result. For example, the character string corresponding to the recognition result may include but not limited to: an English alphabet corresponding to the recognition result, a Chinese character corresponding to the recognition result, a phonetic alphabet corresponding to the recognition result, or an international phonetic alphabet corresponding to the recognition result. The character string corresponding to the to-be-read audio may include but not limited to: a Chinese character corresponding to the to-be-read audio, a phonetic alphabet corresponding to the to-be-read audio, an international phonetic alphabet corresponding to the to-be-read audio or an English alphabet corresponding to the to-be-read audio.

Here, the executing body may recognize the character string corresponding to the recognition result using a plurality of methods.

As an example, a technician may make statistics and then store a large number of recognition results and character strings corresponding to the recognition results into a database (for example, stored using key-value pairs). The character strings corresponding to the recognition results stored in the database may be manually determined. Thus, the executing body may search for a character string stored in association with the recognition result obtained in step 203 from the database, as the character string corresponding to the recognition result.

As still another example, the executing body may input the recognition result obtained in step 203 to a pre-trained first character string generation model, thereby obtaining a character string corresponding to the recognition result. The first character string generation model may be used for generating the character string corresponding to the recognition result. As an example, the first character string generation model may be obtained by inputting a training sample including the recognition result and the character string corresponding to the recognition result into an initial model (for example, a convolutional neural network) and then training the initial model using a machine learning algorithm. The character string corresponding to the recognition result in the training sample may be manually determined.

Similarly, the executing body may acquire the character string corresponding to the to-be-read audio using a plurality of methods.

As an example, a technician may make statistics and then store a large number of to-be-read audios and character strings corresponding to the to-be-read audios into a database (for example, stored using key-value pairs). The character strings corresponding to the to-be-read audios stored in the database may be manually determined. Thus, the executing body may search for a character string stored in association with the to-be-read audio outputted in step 201 from the database, as the character string corresponding to the to-be-read audio.

As still another example, the executing body may input the to-be-read audio obtained in step 201 to a pre-trained second character string generation model, thereby obtaining the character string corresponding to the to-be-read audio. The second character string generation model may be used for generating the character string corresponding to the to-be-read audio. As an example, the second character string generation model may be obtained by inputting a training sample including the to-be-read audio and the character string corresponding to the to-be-read audio into an initial model (for example, a convolutional neural network) and then training the initial model using a machine learning algorithm. The character string corresponding to the to-be-read audio in the training sample may be manually determined.

As an example, the executing body may calculate the similarity between the actually read audio and the to-be-read audio with following formula (1):

$$S=2\times X\div Y \quad (1)$$

In formula (1), S represents the similarity between the actually read audio and the to-be-read audio. X represents the number of identical characters, included in the character string corresponding to the to-be-read audio, in the character string corresponding to the recognition result. Y represents the sum of the number of characters included in the character string corresponding to the recognition result and the number of characters included in the character string corresponding to the to-be-read audio.

For example, if the character string corresponding to the recognition result is "窗问明月光 (pronounced as chuangjianmingyueguang)" and the character string corresponding to the to-be-read audio is "床前明月光 (pronounced as chuangqianmingyueguang)", the number (i.e., the X in the formula) of identical characters, included in the character string corresponding to the to-be-read audio, in the character string corresponding to the recognition result may be "3", and the sum (i.e., the Y in the formula) of the number of characters included in the character string corresponding to the recognition result and the number of characters included in the character string corresponding to the to-be-read audio may be "10". Therefore, the acquired similarity (i.e., the S in the formula) between the actually read audio and the to-be-read audio may be "0.6".

In some optional implementations of the present disclosure, the executing body may calculate the similarity between the actually read audio and the to-be-read audio using the following methods.

First, determining a length of the longest common subsequence (LCS) between the character string corresponding to the to-be-read audio and the character string corresponding to the recognition result, the length being the number of elements included in the longest common subsequence.

And then, calculating the similarity between the actually read audio and the to-be-read audio based on the length and a length of the character string corresponding to the to-be-read audio.

As an example, the executing body may define a ratio of the length of the longest common subsequence to the length of the character string corresponding to the to-be-read audio as the similarity between the actually read audio and the to-be-read audio.

Optionally, the executing body may calculate the similarity between the actually read audio and the to-be-read audio with following formula (2):

$$S=2\times L1\div(L2+L3) \quad (2)$$

In formula (2), S may be used to represent the similarity between the actually read audio and the to-be-read audio, L1 may be used to represent the length of the longest common subsequence, L2 may be used to represent the length of the character string corresponding to the to-be-read audio, and L3 may be used to represent the length of the character string corresponding to the recognition result.

Step 205: the executing body may determine, from a predetermined set of similarity intervals, a similarity interval to which the calculated similarity belongs.

In the present embodiment, the executing body may determine, from a predetermined set of similarity intervals, a similarity interval to which the calculated similarity belongs.

Here, a similarity interval "[0, 1]" may be divided in advance, thereby obtaining a set of similarity intervals. The number of similarity intervals included in the set of similarity intervals may be any positive integer.

As an example, the set of similarity intervals may include similarity intervals "[0,0.6)", "[0.6,0.8)" and "[0.8,1]".

Step 206: outputting a reading evaluation corresponding to the determined similarity interval.

In the present embodiment, each similarity interval in the set of similarity intervals may correspond to a reading evaluation in advance. Hence, the executing body may output a reading evaluation corresponding to the determined similarity interval.

As an example, the similarity interval "[0,0.6)" may correspond to a reading evaluation "please read well next time", the similarity interval "[0.6,0.8)" may correspond to a reading evaluation "good, keep going", and the similarity interval "[0.8,1)" may correspond to a reading evaluation "excellent".

It may be understood that a corresponding relationship between the similarity interval and the reading evaluation may be determined according to actual needs. The reading evaluation may be outputted in the form of text, audio, image, or the like. The reading evaluation may be used to indicate the similarity between the actually read audio and the to-be-read audio. After the executing body outputs the reading evaluation, the user may adjust or continue to maintain a reading strategy, thereby increasing the similarity between the actually read audio and the to-be-read audio and learning how to read.

In some optional implementations of the present embodiment, step 204 may include following steps.

Step 1: in response to determining that the recognition result indicates the actually read audio being a Chinese audio and the to-be-read audio is an English audio or a Chinese audio, determining a phonetic character string corresponding to the to-be-read audio, and determining a phonetic character string corresponding to the recognition result.

Here, the executing body may determine the phonetic character string corresponding to the to-be-read audio using a plurality of methods.

As an example, a technician may make statistics and then store a large number of to-be-read audios and phonetic character strings corresponding to the to-be-read audios into a database (for example, stored using key-value pairs). The phonetic character strings corresponding to the to-be-read audios stored in the database may be manually determined. Thus, the executing body may search for a phonetic character string stored in association with the to-be-read audio outputted in step 201 from the database, as the phonetic character string corresponding to the to-be-read audio.

As still another example, the executing body may input the to-be-read audio obtained in step 201 to a pre-trained third character string generation model, thereby obtaining the phonetic character string corresponding to the to-be-read audio. The third character string generation model may be used for generating the phonetic character string corresponding to the to-be-read audio. As an example, the third character string generation model may be obtained by inputting a training sample including the to-be-read audio and the phonetic character string corresponding to the to-be-read audio into an initial model (for example, a convolutional neural network) and then training the initial model using a machine learning algorithm. The phonetic character string corresponding to the to-be-read audio in the training sample may be manually determined.

Similarly, the executing body may determine the phonetic character string corresponding to the recognition result using a plurality of methods.

As an example, a technician may make statistics and then store a large number of recognition results and phonetic character strings corresponding to the recognition results into a database (for example, stored using key-value pairs). The phonetic character strings corresponding to the recognition results stored in the database may be manually determined. Thus, the executing body may search for a phonetic character string stored in association with the recognition result obtained in step 203 from the database, as the phonetic character string corresponding to the recognition result.

As still another example, the executing body may input the recognition result obtained in step 203 to a pre-trained fourth character string generation model, thereby obtaining the phonetic character string corresponding to the recognition result. The fourth character string generation model may be used for generating the phonetic character string corresponding to the recognition result. As an example, the fourth character string generation model may be obtained by inputting a training sample including the recognition result and the phonetic character string corresponding to the recognition result into an initial model (for example, a convolutional neural network) and then training the initial model using a machine learning algorithm. The phonetic character string corresponding to the recognition result in the training sample may be manually determined.

Step 2: calculating a similarity between the actually read audio and the to-be-read audio based on a phonetic character string corresponding to the to-be-read audio and a phonetic character string corresponding to the recognition result.

As an example, the executing body may calculate the similarity between the actually read audio and the to-be-read audio with following formula (3):

$$S=2 \times X \div Y \quad (3)$$

In formula (3), S represents the similarity between the actually read audio and the to-be-read audio. X represents the number of identical characters, included in the phonetic character string corresponding to the to-be-read audio, in the phonetic character string corresponding to the recognition result. Y represents the sum of the number of phonetic characters included in the phonetic character string corresponding to the recognition result and the number of phonetic characters included in the phonetic character string corresponding to the to-be-read audio.

In some optional implementations of the present disclosure, the executing body may calculate the similarity between the actually read audio and the to-be-read audio using the following methods.

First, determining a length of the longest common subsequence between the phonetic character string corresponding to the to-be-read audio and the phonetic character string corresponding to the recognition result.

And then, determining a ratio of the length of the longest common subsequence to a length of the phonetic character string corresponding to the to-be-read audio as the similarity between the actually read audio and the to-be-read audio.

In some optional implementations of the present embodiment, step 204 may include following steps.

Step 1: in response to determining that the recognition result indicates the actually read audio being an English audio and the to-be-read audio is a Chinese audio, determining a phonetic character string corresponding to the to-be-read audio, and determining an English character string corresponding to the recognition result.

Here, the executing body may acquire the English character string corresponding to the recognition result using a plurality of methods.

As an example, a technician may make statistics and then store a large number of recognition results and English character strings corresponding to the recognition results into a database (for example, stored using key-value pairs). The English character strings corresponding to the recognition results stored in the database may be manually annotated. Thus, the executing body may search for an English character string stored in association with the recognition result obtained in step 203 from the database, as the English character string corresponding to the recognition result.

As still another example, the executing body may input the recognition result obtained in step 203 to a pre-trained fifth character string generation model, thereby obtaining the English character string corresponding to the recognition result. The fifth character string generation model may be used for generating the English character string corresponding to the recognition result. As an example, the fifth character string generation model may be obtained by inputting a training sample including the recognition result and the English character string corresponding to the recognition result into an initial model (for example, a convolutional neural network) and then training the initial model using a machine learning algorithm. The English character strings corresponding to the recognition results in the training sample may be manually annotated.

Step 2: calculating a similarity between the actually read audio and the to-be-read audio based on a phonetic character string corresponding to the to-be-read audio and an English character string corresponding to the recognition result.

Here, the executing body may calculate the similarity between the actually read audio and the to-be-read audio using a plurality of methods.

As an example, the executing body may calculate the similarity between the actually read audio and the to-be-read audio with following formula (4):

$$S=2 \times X \div Y \quad (4)$$

In formula (4), S represents the similarity between the actually read audio and the to-be-read audio. X represents the number of identical characters, included in the phonetic character string corresponding to the to-be-read audio, in the English character string corresponding to the recognition result. Y represents the sum of the number of English characters included in the English character string corresponding to the recognition result and the number of phonetic characters included in the phonetic character string corresponding to the to-be-read audio.

In some optional implementations of the present disclosure, the executing body may calculate the similarity between the actually read audio and the to-be-read audio using the following methods.

First, determining a length of the longest common subsequence between the phonetic character string corresponding to the to-be-read audio and the English character string corresponding to the recognition result.

And then, determining a ratio of the length of the longest common subsequence to a length of the phonetic character string corresponding to the to-be-read audio as the similarity between the actually read audio and the to-be-read audio.

In some optional implementations of the present embodiment, step 204 may include following steps.

Step 1: in response to determining that the recognition result indicates the actually read audio being an English audio and the to-be-read audio is an English audio, determining an English character string corresponding to the to-be-read audio, and determining an English character string corresponding to the recognition result.

Here, the executing body may obtain the English character string corresponding to the to-be-read audio using a plurality of methods.

As an example, a technician may make statistics and then store a large number of to-be-read audios and English character strings corresponding to the to-be-read audios into a database (for example, stored using key-value pairs). The English character strings corresponding to the to-be-read audios stored in the database may be manually annotated. Thus, the executing body may search for an English character string stored in association with the to-be-read audio outputted in step 201 from the database, as the English character string corresponding to the to-be-read audio.

As still another example, the executing body may input the to-be-read audio obtained in step 201 to a pre-trained sixth character string generation model, thereby obtaining the English character string corresponding to the to-be-read audio. The sixth character string generation model may be used for generating the English character string corresponding to the to-be-read audio. As an example, the sixth character string generation model may be obtained by inputting a training sample including the to-be-read audio and the English character string corresponding to the to-be-read audio into an initial model (for example, a convolutional neural network) and then training the initial model using a machine learning algorithm. The English character string corresponding to the to-be-read audio in the training sample may be manually annotated.

Step 2: calculating a similarity between the actually read audio and the to-be-read audio based on an English character string corresponding to the to-be-read audio and an English character string corresponding to the recognition result.

Here, the executing body may calculate the similarity between the actually read audio and the to-be-read audio using a plurality of methods.

As an example, the executing body may calculate the similarity between the actually read audio and the to-be-read audio with following formula (5):

$$S=2\times X+Y \qquad (5)$$

In formula (5), S represents the similarity between the actually read audio and the to-be-read audio. X represent the number of identical English characters, included in the English character string corresponding to the to-be-read audio, in the English character string corresponding to the recognition result. Y represents the sum of the number of English characters included in the English character string corresponding to the recognition result and the number of English characters included in the English character string corresponding to the to-be-read audio.

In some optional implementations of the present disclosure, the executing body may calculate the similarity between the actually read audio and the to-be-read audio using the following methods.

First, determining a length of the longest common subsequence between the English character string corresponding to the to-be-read audio and the English character string corresponding to the recognition result.

And then, determining a ratio of the length of the longest common subsequence to a length of the English character string corresponding to the to-be-read audio as the similarity between the actually read audio and the to-be-read audio.

Figure 3A:
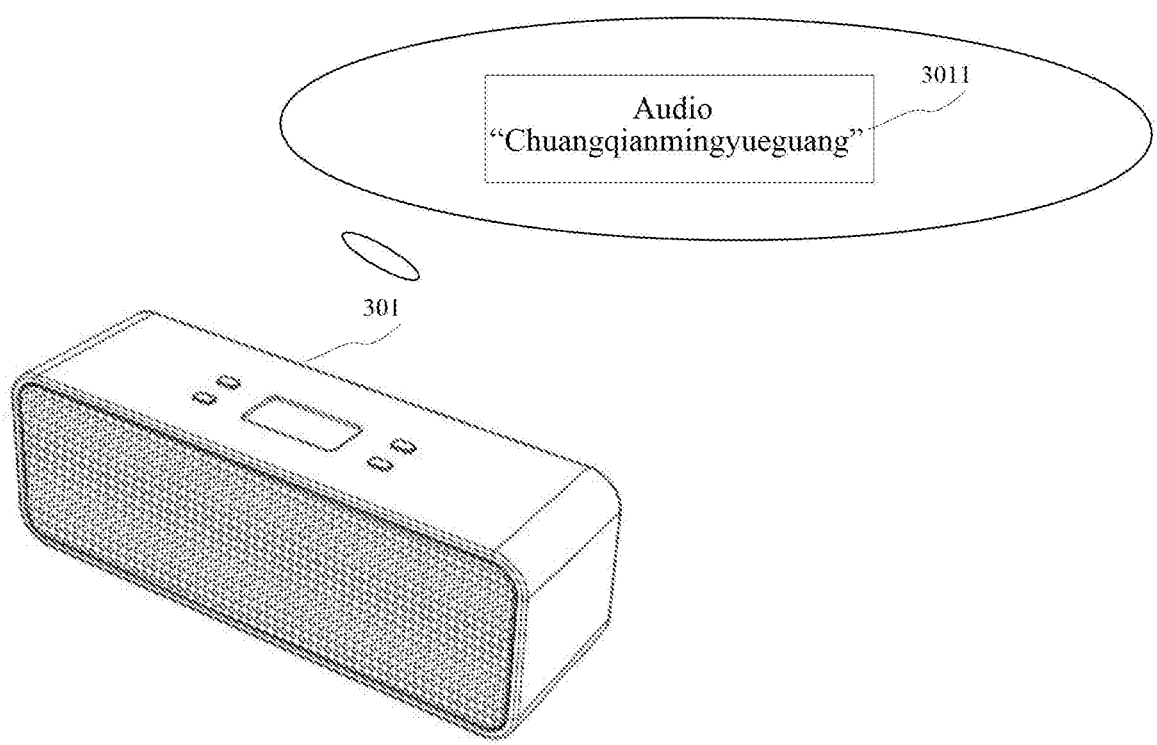
FIGS. 3A, 3B and 3C are schematic diagrams of an application scenario of the method for outputting information according to an embodiment of the present disclosure.
Figure 3B:
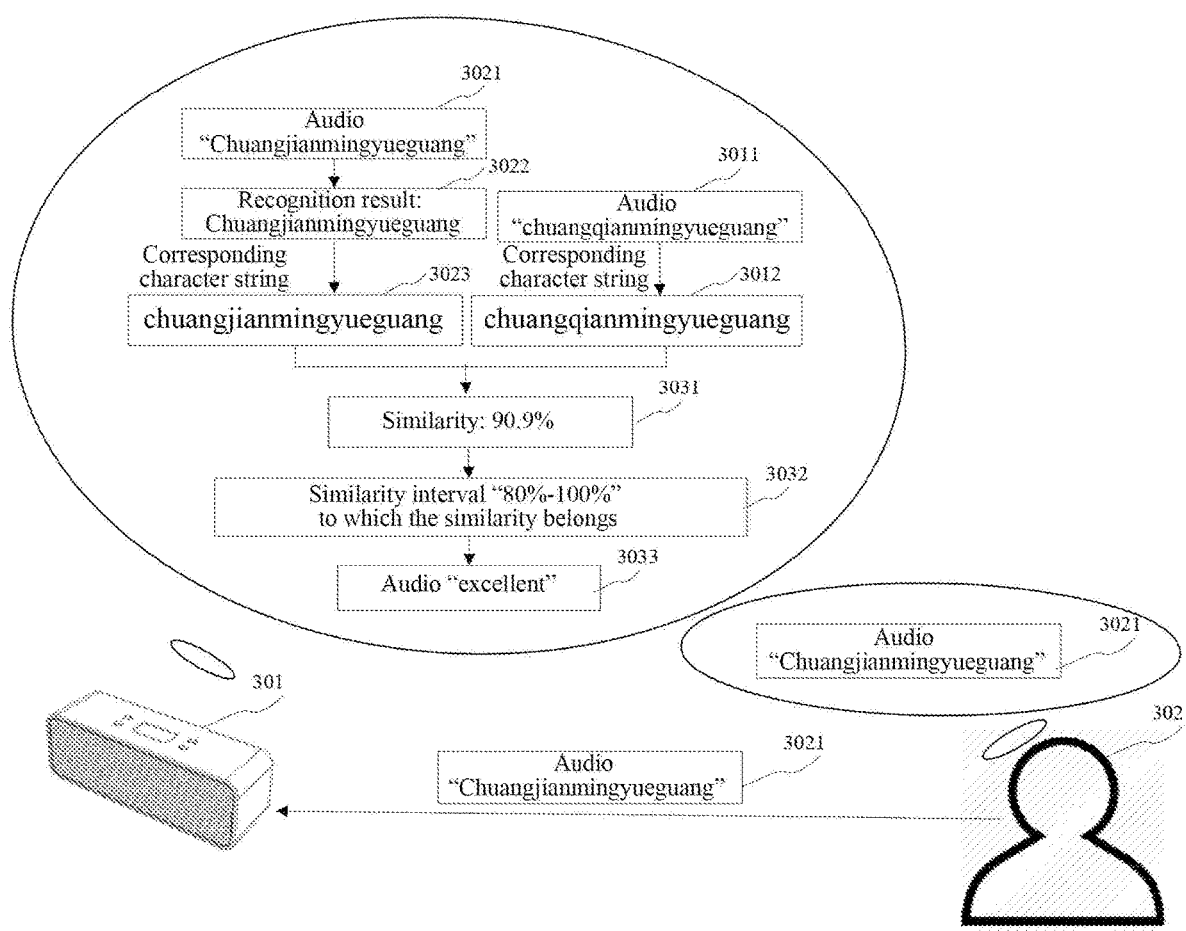
Figure 3C:
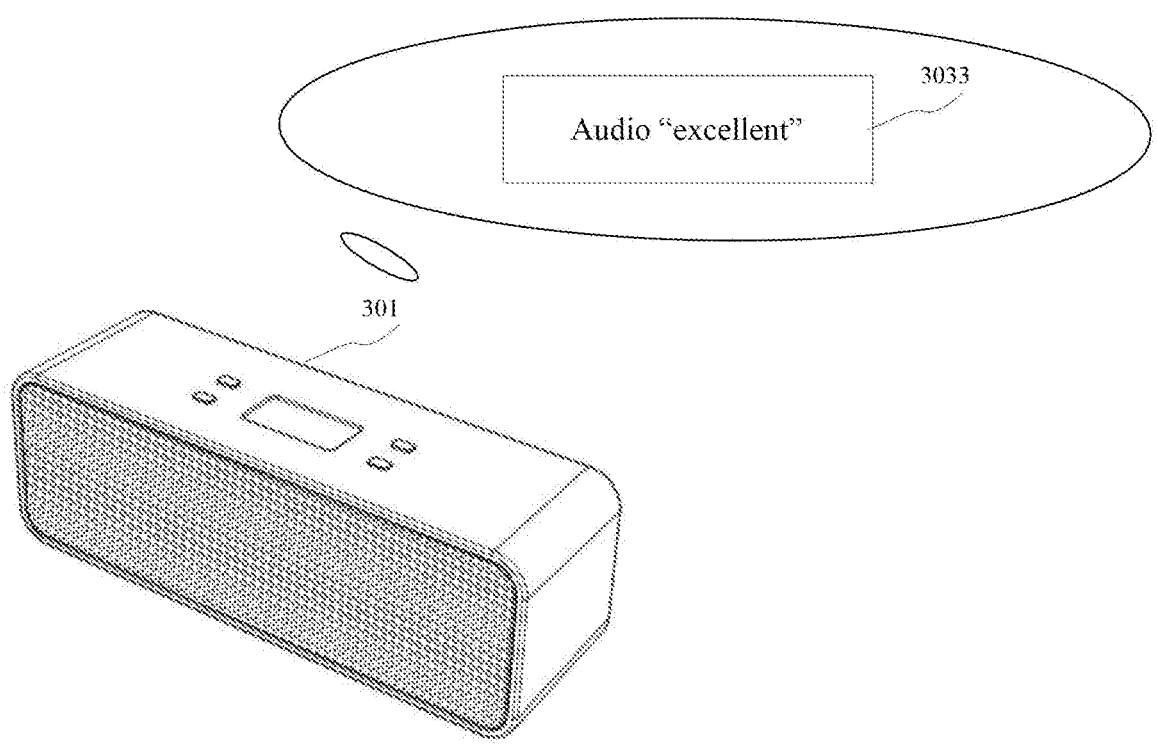

Further referring to FIG. 3A to FIG. 3C, schematic diagrams of an application scenario of the method for outputting information according to some embodiments of the present disclosure are shown. In FIG. 3A, after a speaker 301 receives a reading instruction from a user, the speaker 301 outputs a to-be-read audio 3011 (illustrated as audio "chuangqianmingyueguang"). Referring to FIG. 3B, the speaker 301 acquires an actually read audio 3021 (illustrated as audio "chuangjianmingyueguang") obtained by reading the to-be-read audio 3011 by the user 302. The speaker 301 performs voice recognition on the actually read audio 3021 to obtain a recognition result 3022. The speaker 301 calculates a similarity 3031 between the actually read audio 3021 and the to-be-read audio 3011 based on a character string 3023 corresponding to the recognition result and a character string 3012 corresponding to the to-be-read audio 3011. The speaker 301 determines, from a predetermined set of similarity intervals, a similarity interval 3032 to which the calculated similarity belongs. The speaker 301 determines a reading evaluation 3033 corresponding to the similarity interval 3032. Finally, referring to FIG. 3C, the speaker 301 outputs the reading evaluation 3033 corresponding to the determined similarity interval 3032.

At present, a method of matching a to-be-read audio with an actually read audio, or a method of matching a text corresponding to the to-be-read audio with a text corresponding to the actually read audio in terms of character string is used, and then reading correctness is determined by determining whether the two are consistent. The method of matching the to-be-read audio with the actually read audio requires acquiring an original audio file. However, the actually read audio file will not be sent to the backend due to security and privacy. Therefore, such method does not work in the skill development of an intelligent speaker. In the method of matching a text corresponding to the to-be-read audio with a text corresponding to the actually read audio in terms of character string, just character string matching is used. If the character strings are completely consistent, it is determined that the read audio is correct, otherwise the read audio is inaccurate. Such method has a large error, often resulting in a final judgment error due to an error in speech recognition. However, in some cases, a reader may not be able to accurately pronounce the same audio as an audio pronounced from an intelligent device due to factors such as younger age, stuttering, nationality and place of origin, or the intelligent device may consider that the audio pronounced by the reader is different from the audio pronounced by the intelligent device due to an error in speech recognition. It can be seen that the prior art has a need to determine a new reading solution for such people.

By executing the following steps, the method provided by some embodiments of the present disclosure may determine the accuracy of a read audio pronounced by a reader, and then help the reader to improve the learning efficiency and learning interest so as to improve the rate of a user using a device: outputting a to-be-read audio in response to receiving a reading instruction from the user; acquiring an actually read audio obtained by reading the to-be-read audio by the user; performing speech recognition on the actually read audio to obtain a recognition result; calculating a similarity between the actually read audio and the to-be-read audio based on a character string corresponding to the recognition result and a character string corresponding to the to-be-read audio; determining, from a predetermined set of similarity intervals, a similarity interval to which the calculated similarity belongs; and outputting a reading evaluation corresponding to the determined similarity interval. In addition, the solution may be executed in a terminal device (for example, a speaker) without sending an actually read audio file to a backend server, thereby improving the information security of the user and saving occupied network resources.

Figure 4:
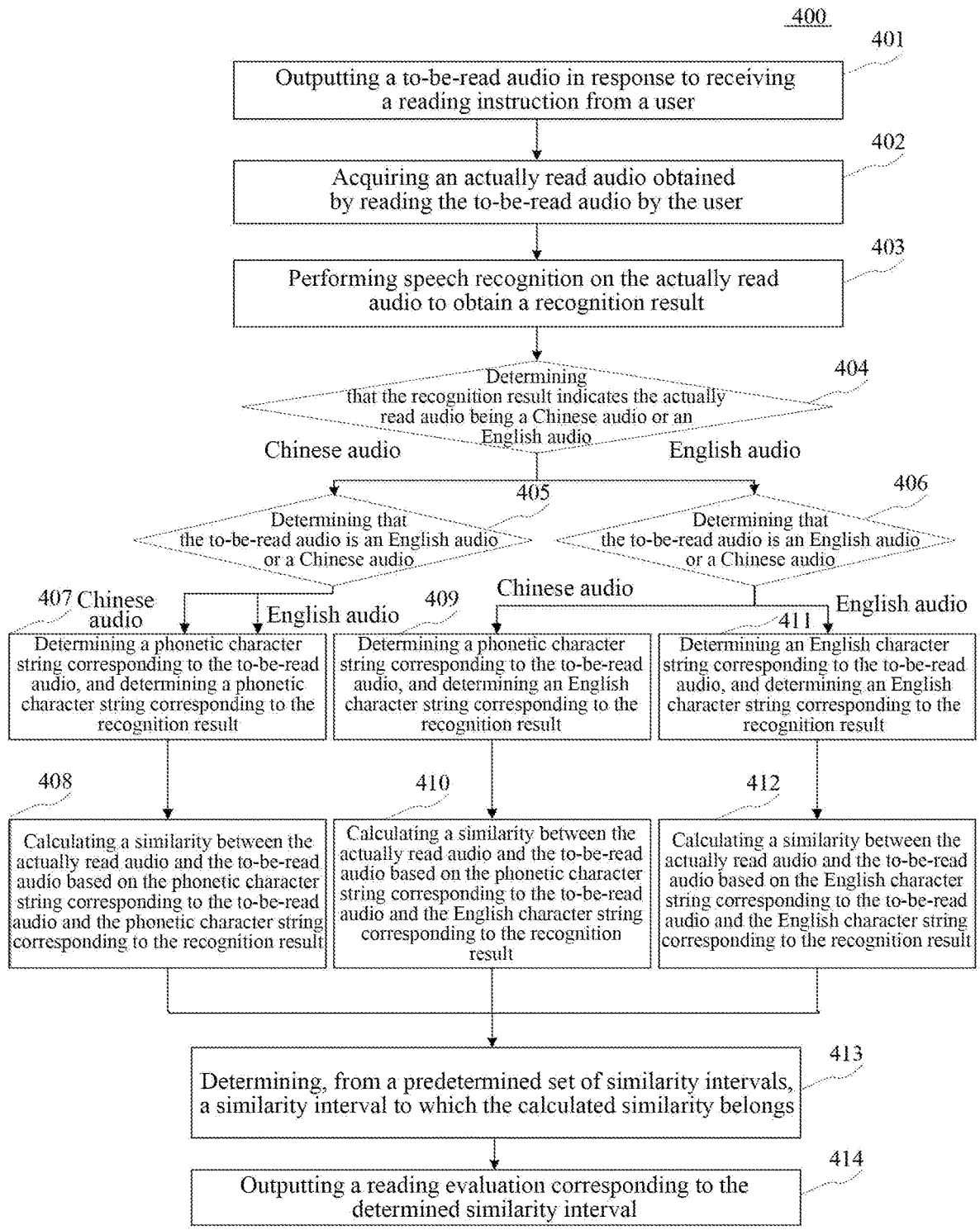
FIG. 4 is a flowchart of the method for outputting information according to another embodiment of the present disclosure.

Further referring to FIG. 4, a flow 400 of a method for outputting information according to another embodiment of the present disclosure is shown. The flow 400 of the method for outputting information comprises following steps.

Step 401: outputting a to-be-read audio in response to receiving a reading instruction from a user, and then executing step 402.

In the present embodiment, step 401 is basically consistent with step 201 in an embodiment corresponding to FIG. 2, and such step will not be repeated here.

Step 402: acquiring an actually read audio obtained by reading the to-be-read audio by the user, and then executing step 403.

In the present embodiment, step 402 is basically consistent with step 202 in the embodiment corresponding to FIG. 2, and such step will not be repeated here.

Step 403: performing speech recognition on the actually read audio to obtain a recognition result, and then executing step 404.

In the present embodiment, step 403 is basically consistent with step 203 in the embodiment corresponding to FIG. 2, and such step will not be repeated here.

Step 404: determining that the recognition result indicates the actually read audio being a Chinese audio or an English audio. In response to determining that the recognition result indicates the actually read audio being a Chinese audio, executing step 405; and in response to determining that the recognition result indicates the actually read audio being an English audio, executing step 406.

In the present embodiment, the executing body (for example, the terminal device shown in FIG. 1) of the method for outputting information may determine that the recognition result indicates the actually read audio being a Chinese audio or an English audio.

Step 405: determining that the to-be-read audio is an English audio or a Chinese audio. In response to determining that the to-be-read audio is an English audio, executing step 407; and in response to determining that the to-be-read audio is a Chinese audio, executing step 407.

In the present embodiment, the executing body may determine that the to-be-read audio is an English audio or a Chinese audio.

Step 406: determining that the to-be-read audio is an English audio or a Chinese audio. In response to determining that the to-be-read audio is an English audio, executing step 411; and in response to determining that the to-be-read audio is a Chinese audio, executing step 409.

In the present embodiment, the executing body may determine that the to-be-read audio is an English audio or a Chinese audio.

Step 407: determining a phonetic character string corresponding to the to-be-read audio and determining a phonetic character string corresponding to the recognition result, and then executing step 408.

In the present embodiment, the executing body may determine a phonetic character string corresponding to the to-be-read audio and determine a phonetic character string corresponding to the recognition result.

Step 408: calculating a similarity between the actually read audio and the to-be-read audio based on the phonetic character string corresponding to the to-be-read audio and the phonetic character string corresponding to the recognition result, and then executing step 413.

In the present embodiment, the executing body may calculate the similarity between the actually read audio and the to-be-read audio based on the phonetic character string corresponding to the to-be-read audio and the phonetic character string corresponding to the recognition result.

Step 409: determining a phonetic character string corresponding to the to-be-read audio and determining an English character string corresponding to the recognition result, and then executing step 410.

In the present embodiment, the executing body may determine a phonetic character string corresponding to the to-be-read audio and determine an English character string corresponding to the recognition result.

Step 410: calculating a similarity between the actually read audio and the to-be-read audio based on the phonetic character string corresponding to the to-be-read audio and the English character string corresponding to the recognition result, and then executing step 413.

In the present embodiment, the executing body may calculate the similarity between the actually read audio and the to-be-read audio based on the phonetic character string corresponding to the to-be-read audio and the English character string corresponding to the recognition result.

Step 411: determining an English character string corresponding to the to-be-read audio and determining an English character string corresponding to the recognition result, and then executing step 412.

In the present embodiment, the executing body may determine an English character string corresponding to the to-be-read audio and determine an English character string corresponding to the recognition result.

Step 412: calculating a similarity between the actually read audio and the to-be-read audio based on the English character string corresponding to the to-be-read audio and the English character string corresponding to the recognition result, and then executing step 413.

In the present embodiment, the executing body may calculate the similarity between the actually read audio and the to-be-read audio based on the English character string corresponding to the to-be-read audio and the English character string corresponding to the recognition result.

Step 413: determining, from a predetermined set of similarity intervals, a similarity interval to which the calculated similarity belongs, and then executing step 414.

In the present embodiment, the executing body may determine, from a predetermined set of similarity intervals, a similarity interval to which the calculated similarity belongs.

Step 414: outputting a reading evaluation corresponding to the determined similarity interval.

In the present embodiment, the executing body may output a reading evaluation corresponding to the determined similarity interval.

It should be noted that, in addition to the contents described above, the present embodiment may also include the same features as the embodiment corresponding to FIG. 2, and the same beneficial effects are generated. Such contents will not be described again in the present embodiment.

As shown in FIG. 4, compared with the embodiment corresponding to FIG. 2, the flow 400 of the method for outputting information in the present embodiment highlights the specific steps of calculating the similarity between the actually read audio and the to-be-read audio in cases that the to-be-read audio is a Chinese audio or an English audio and the actually read audio is a Chinese audio or an English audio respectively. Thus, the solution described in the present embodiment may adopt different similarity calculation methods in different situations, thereby further enriching the reading methods.

Figure 5:
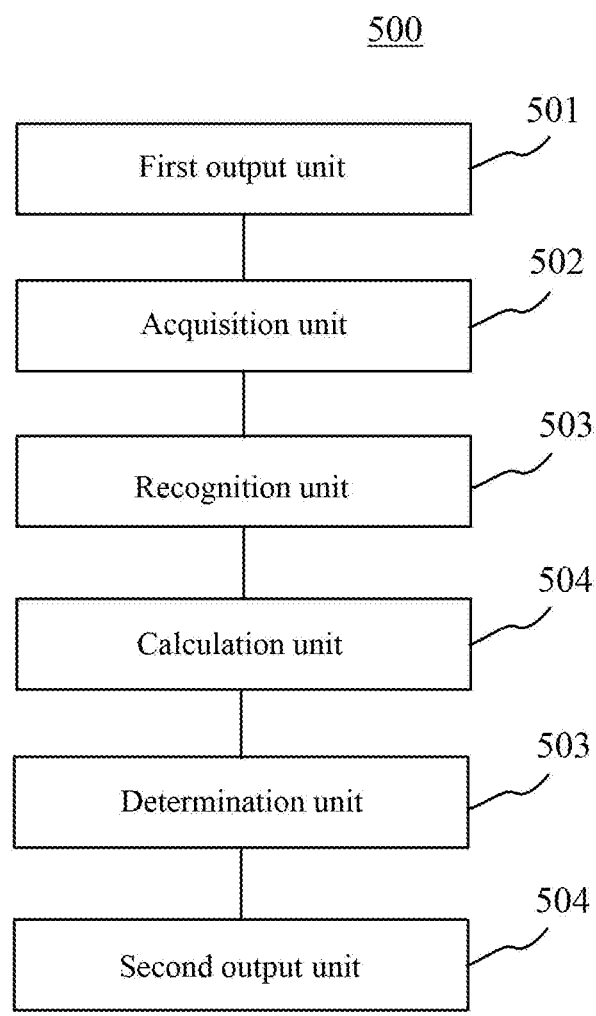
FIG. 5 is a schematic structural diagram of an apparatus for outputting information according to an embodiment of the present disclosure.

Further referring to FIG. 5, as an implementation of the method shown in each figure, an embodiment of the present disclosure provides an apparatus for outputting information. The apparatus embodiment corresponds to the method embodiment shown in FIG. 2. In addition to the features recorded below, the apparatus embodiment may also include features identical with or corresponding to the method embodiment shown in FIG. 2. The apparatus may be applied to various electronic devices specifically.

As shown in FIG. 5, the apparatus 500 for outputting information in the present embodiment comprises a first output unit 501, an acquisition unit 502, a recognition unit 503, a calculation unit 504, a determination unit 505 and a second output unit 506. The first output unit 501 is configured for outputting a to-be-read audio in response to receiving a reading instruction from a user; the acquisition unit 502 is configured for acquiring an actually read audio obtained by reading the to-be-read audio by the user; the recognition unit 503 is configured for performing speech recognition on the actually read audio to obtain a recognition result; the calculation unit 504 is configured for calculating a similarity between the actually read audio and the to-be-read audio based on a character string corresponding to the recognition result and a character string corresponding to the to-be-read audio; the determination unit 505 is configured for determining, from a predetermined set of similarity intervals, a similarity interval to which the calculated similarity belongs; and the second output unit 506 is configured for outputting a reading evaluation corresponding to the determined similarity interval.

In the present embodiment, the first output unit 501 of the apparatus 500 for outputting information may output a to-be-read audio. The user may be a user of the apparatus 500. The reading instruction may be an instruction generated by the user by interacting with the apparatus 500, and the reading instruction may be used to instruct the apparatus 500 to enter a reading mode (i.e., a mode in which the user repeats an audio outputted by the apparatus 500).

Here, the reading instruction may include but not limited to an instruction generated by the user by pronouncing a voice "reading", clicking or pressing a button for instructing to read. The to-be-read audio may be an audio to be read by various users. As an example, the to-be-read audio may be an audio in various languages (e.g., English, Japanese or French), and may also be an audio of children's songs or ancient poems.

In the present embodiment, the acquisition unit 502 may acquire an actually read audio that is outputted by the first output unit 501 and obtained by reading the to-be-read audio by the user.

Here, after the apparatus 500 outputs the to-be-read audio, the user may read the to-be-read audio. It may be understood that the audio pronounced by the user after the reading is the actually read audio. And then, the apparatus 500 may acquire the actually read audio.

In practice, the executing body, after outputting the to-be-read audio, may determine any audio pronounced by the user as an actually read audio, thereby acquiring the actually read audio.

In the present embodiment, the recognition unit 503 may perform speech recognition on the actually read audio to obtain a recognition result. The recognition result may be a word corresponding to the actually read audio.

In the present embodiment, the calculation unit 504 may calculate a similarity between the actually read audio and the to-be-read audio based on a character string corresponding to the recognition result and a character string corresponding to the to-be-read audio.

In the present embodiment, the determination unit 505 may determine, from a predetermined set of similarity intervals, a similarity interval to which the calculated similarity belongs.

In the present embodiment, each similarity interval in the set of similarity intervals may correspond to a reading evaluation in advance. Hence, the second output unit 506 may output a reading evaluation corresponding to the determined similarity interval.

In some optional implementations of the present embodiment, the calculation unit 504 comprises: a first determination module (not shown), configured for in response to determining that the recognition result indicates the actually read audio being a Chinese audio and the to-be-read audio is an English audio or a Chinese audio, determining a phonetic character string corresponding to the to-be-read audio, and determining a phonetic character string corresponding to the recognition result; and a first calculation module (not shown), configured for calculating the similarity between the actually read audio and the to-be-read audio based on the phonetic character string corresponding to the to-be-read audio and the phonetic character string corresponding to the recognition result.

In some optional implementations of the present embodiment, the calculation unit 504 comprises: a second determination module (not shown), configured for in response to determining that the recognition result indicates the actually read audio being an English audio and the to-be-read audio is a Chinese audio, determining a phonetic character string corresponding to the to-be-read audio, and determining an English character string corresponding to the recognition result; and a second calculation module (not shown), configured for calculating the similarity between the actually read audio and the to-be-read audio based on the phonetic character string corresponding to the to-be-read audio and the English character string corresponding to the recognition result.

In some optional implementations of the present embodiment, the calculation unit 504 comprises: a third determination module (not shown), configured for in response to determining that the recognition result indicates the actually read audio being an English audio and the to-be-read audio is an English audio, determining an English character string corresponding to the to-be-read audio, and determining an English character string corresponding to the recognition result; and a third calculation module (not shown), configured for calculating the similarity between the actually read audio and the to-be-read audio based on the English character string corresponding to the to-be-read audio and the English character string corresponding to the recognition result.

In some optional implementations of the present embodiment, the calculation unit 504 comprises: a fourth determination module (not shown), configured for determining a length of the longest common subsequence between the character string corresponding to the to-be-read audio and the character string corresponding to the recognition result; and a fourth calculation module (not shown), configured for calculating the similarity between the actual read-after audio and the to-be-read audio based on the length and a length of the character string corresponding to the to-be-read audio.

In the apparatus for outputting information provided by some embodiments of the present disclosure, the first output unit 501 outputs a to-be-read audio in response to receiving a reading instruction from the user; the acquisition unit 502 acquires an actually read audio obtained by reading the to-be-read audio by the user; the recognition unit 503 performs speech recognition on the actually read audio to obtain a recognition result; the calculation unit 504 calculates a similarity between the actually read audio and the to-be-read audio based on a character string corresponding to the recognition result and a character string corresponding to the to-be-read audio; the determination unit 505 determines, from a predetermined set of similarity intervals, a similarity interval to which the calculated similarity belongs; and the second output unit 506 outputs a reading evaluation corresponding to the determined similarity interval, thereby helping a reader to improve the learning efficiency and learning interest so as to improve the rate of a user using a device.

Figure 6:
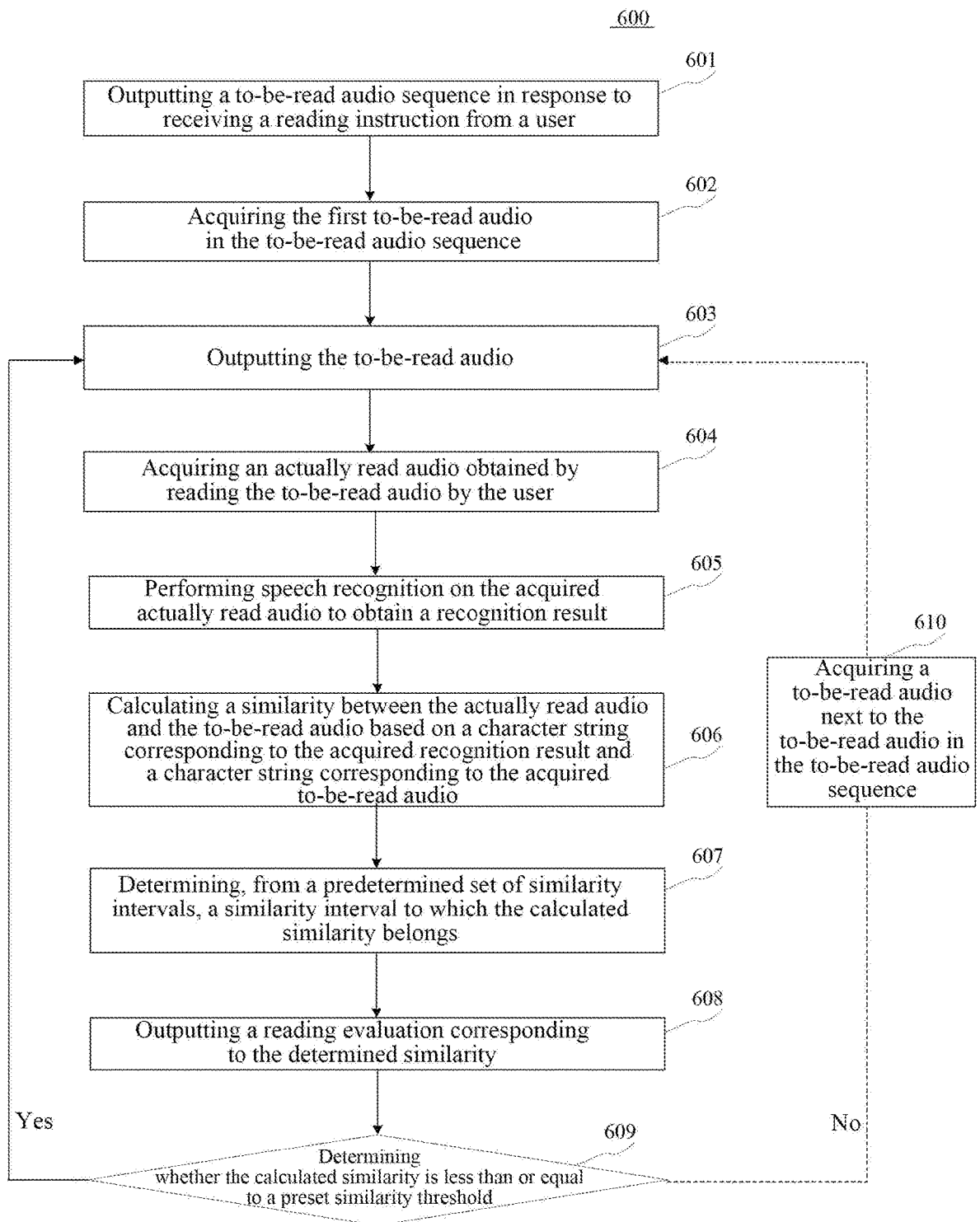
FIG. 6 is a flowchart of another method for outputting information according to an embodiment of the present disclosure.

Referring to FIG. 6, a flow 600 of a method for outputting information according to another embodiment of the present disclosure is shown. The method for outputting information comprises following steps.

Step 601: outputting a to-be-read audio sequence in response to receiving a reading instruction from a user, and then executing step 602.

In the present embodiment, the executing body (for example, the terminal device shown in FIG. 1) of the method for outputting information may output a to-be-read audio sequence in response to receiving a reading instruction from a user. The user may be a user of the executing body. The reading instruction may be an instruction generated by the user by interacting with the executing body, and the reading instruction may be used to instruct the executing body to enter a reading mode (i.e., a mode in which the user repeats an audio outputted by the executing body).

Here, the reading instruction may include but not limited to an instruction generated by the user by pronouncing a voice "reading", clicking or pressing a button for instructing to read. The to-be-read audio may be an audio to be read by various users. As an example, the to-be-read audio may be an audio in various languages (e.g., English, Japanese or French), and may also be an audio of children's songs or ancient poems.

In practice, the to-be-read audio sequence may be an ancient poem, and the to-be-read audio in the to-be-read audio sequence may be one sentence of the ancient poem. The to-be-read audio sequence may also be an audio including a plurality of English words. The to-be-read audio in the to-be-read audio sequence may be an audio of one English word in the audio including the plurality of English words.

Step 602: acquiring the first to-be-read audio in the to-be-read audio sequence, and then executing step 603.

In the present embodiment, the executing body may acquire the first to-be-read audio in the to-be-read audio sequence.

Step 603: outputting the to-be-read audio, and then executing step 604.

In the present embodiment, the executing body may output the to-be-read audio.

Step 604: acquiring an actually read audio obtained by reading the to-be-read audio by the user, and then executing step 605.

In the present embodiment, the executing body may acquire an actually read audio obtained by reading the to-be-read audio by the user.

Step 605: performing speech recognition on the acquired actually read audio to obtain a recognition result, and then executing step 606.

In the present embodiment, the executing body may perform speech recognition on the acquired actually read audio to obtain a recognition result.

Step 606: calculating a similarity between the actually read audio and the to-be-read audio based on a character string corresponding to the acquired recognition result and a character string corresponding to the acquired to-be-read audio, and then executing step 607.

In the present embodiment, the executing body may calculate a similarity between the actually read audio and the to-be-read audio based on a character string corresponding to the acquired recognition result and a character string corresponding to the acquired to-be-read audio.

Step 607: determining, from a predetermined set of similarity intervals, a similarity interval to which the calculated similarity belongs, and then executing step 608.

In the present embodiment, the executing body may determine, from a predetermined set of similarity intervals, a similarity interval to which the calculated similarity belongs.

Step 608: outputting a reading evaluation corresponding to the determined similarity interval, and then executing step 609.

In the present embodiment, the executing body may output a reading evaluation corresponding to the determined similarity interval.

Step 609: determining whether the calculated similarity is less than or equal to a preset similarity threshold. If yes, executing step 603, otherwise executing step 610.

In the present embodiment, the executing body may determine whether the calculated similarity is less than or equal to a preset similarity threshold.

Here, steps 603 to 609 are reading steps.

Optionally, the executing body may also executing following step 610.

Step 610: acquiring a to-be-read audio next to the to-be-read audio in the to-be-read audio sequence, and then executing step 603.

In some optional implementations of the present embodiment, the executing body may also acquire a to-be-read audio next to the to-be-read audio in the to-be-read audio sequence.

It should be noted that, in addition to the contents described above, the present embodiment may also include the same features as the embodiment corresponding to FIG. 2, and the same beneficial effects are generated. Such contents will not be described again in the present embodiment.

At present, a method of matching a to-be-read audio with an actually read audio, or a method of matching a text corresponding to the to-be-read audio with a text corresponding to the actually read audio in terms of character string is used, and then reading correctness is determined by determining whether the two are consistent. The method of matching the to-be-read audio with the actually read audio requires acquiring an original audio file. However, the actually read audio file will not be sent to the backend due to security and privacy. Therefore, such method does not work in the skill development of an intelligent speaker. In the method of matching a text corresponding to the to-be-read audio with a text corresponding to the actually read audio in terms of character string, just character string matching is used. If the character strings are completely consistent, it is determined that the read audio is correct, otherwise the read audio is inaccurate. Such method has a large error, often resulting in a final judgment error due to an error in speech recognition. However, in some cases, a reader may not be able to accurately pronounce the same audio as an audio pronounced from an intelligent device due to factors such as younger age, stuttering, nationality and place of origin, or the intelligent device may consider that the audio pronounced by the reader is different from the audio pronounced by the intelligent device due to an error in speech recognition. It can be seen that the prior art has a need to determine a new reading solution for such people.

By executing the following steps, the method provided by some embodiments of the present disclosure may determine the accuracy of a read audio pronounced by a reader, and then help the reader to improve the learning efficiency and learning interest so as to improve the rate of a user using a device: outputting a to-be-read audio in response to receiving a reading instruction from the user; acquiring an actually read audio obtained by reading the to-be-read audio by the user; performing speech recognition on the actually read audio to obtain a recognition result; calculating a similarity between the actually read audio and the to-be-read audio based on a character string corresponding to the recognition result and a character string corresponding to the to-be-read audio; determining, from a predetermined set of similarity intervals, a similarity interval to which the calculated similarity belongs; and outputting a reading evaluation corresponding to the determined similarity interval. In addition, the solution may be executed in a terminal device (for example, a speaker) without sending an actually read audio file to a backend server, thereby improving the information security of the user and saving occupied network resources.

Figure 7:
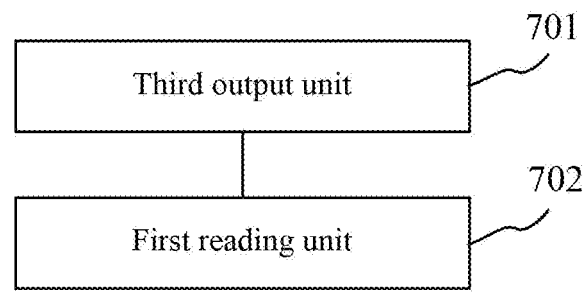
FIG. 7 is a schematic structural diagram of another apparatus for outputting information according to an embodiment of the present disclosure.

Further referring to FIG. 7, as an implementation of the method shown in each figure, an embodiment of the present disclosure provides another apparatus for outputting information. The apparatus embodiment may correspond to the method embodiment shown in FIG. 6. In addition to the features recorded below, the apparatus embodiment may also include features identical with or corresponding to the method embodiment shown in FIG. 6. The apparatus may be applied to various electronic devices.

As shown in FIG. 7, an apparatus 700 for outputting information in the present embodiment comprises a third output unit 701 and a first continuing execution unit 702. The third output unit 701 is configured for: in response to receiving a reading instruction from a user, outputting a to-be-read audio sequence, and performing following reading steps for each to-be-read audio in the to-be-read audio sequence: outputting the to-be-read audio; acquiring an actually read audio obtained by reading the to-be-read audio by the user; performing speech recognition on the acquired actually read audio to obtain a recognition result; calculating a similarity between the acquired actually read audio and the to-be-read audio based on a character string corresponding to the recognition result and a character string corresponding to the to-be-read audio; determining, from a predetermined set of similarity intervals, a similarity interval to which the calculated similarity belongs; and outputting a reading evaluation corresponding to the determined similarity interval. The first continuing execution unit 702 is configured in response to determining the calculated similarity being less than or equal to a preset similarity threshold, proceeding to perform the reading steps based on the to-be-read audio.

In the present embodiment, the third output unit 701 comprised in the apparatus 700 for outputting information may be configured for: outputting a to-be-read audio sequence in response to receiving a reading instruction from a user, and executing following reading steps for each to-be-read audio in the to-be-read audio sequence: outputting the to-be-read audio; acquiring an actually read audio obtained by reading the to-be-read audio by the user; performing speech recognition on the acquired actually read audio to obtain a recognition result; calculating a similarity between the acquired actually read audio and the to-be-read audio based on a character string corresponding to the recognition result and a character string corresponding to the to-be-read audio; determining, from a predetermined set of similarity intervals, a similarity interval to which the calculated similarity belongs; and outputting a reading evaluation corresponding to the determined similarity interval.

In the present embodiment, the first continuing execution unit 702, in response to determining the calculated similarity calculated by the third output unit 701 being less than or equal to the preset similarity threshold, proceeds to perform the reading steps based on the to-be-read audio.

In some optional implementations of the present embodiment, the apparatus also comprises a second continuing execution unit (not shown), configured for in response to determining the calculated similarity being greater than the preset similarity threshold, proceeding to perform the reading steps based on a to-be-read audio next to the to-be-read audio in the to-be-read audio sequence.

In the apparatus provided by some embodiments of the present disclosure, the third output unit 701 outputs a to-be-read audio sequence in response to receiving a reading instruction from a user, and performs following reading steps for each to-be-read audio in the to-be-read audio sequence: outputting the to-be-read audio; acquiring an actually read audio obtained by reading the to-be-read audio by the user; performing speech recognition on the acquired actually read audio to obtain a recognition result; calculating a similarity between the acquired actually read audio and the to-be-read audio based on a character string corresponding to the recognition result and a character string corresponding to the to-be-read audio; determining, from a predetermined set of similarity intervals, a similarity interval to which the calculated similarity belongs; and outputting a reading evaluation corresponding to the determined similarity interval; and the first continuing execution unit 702, in response to determining the calculated similarity being less than or equal to a preset similarity threshold, proceeds to perform the reading steps based on the to-be-read audio, thereby helping a user to improve learning efficiency and learning interest so as to improve the rate of the user using a device.

Figure 8:
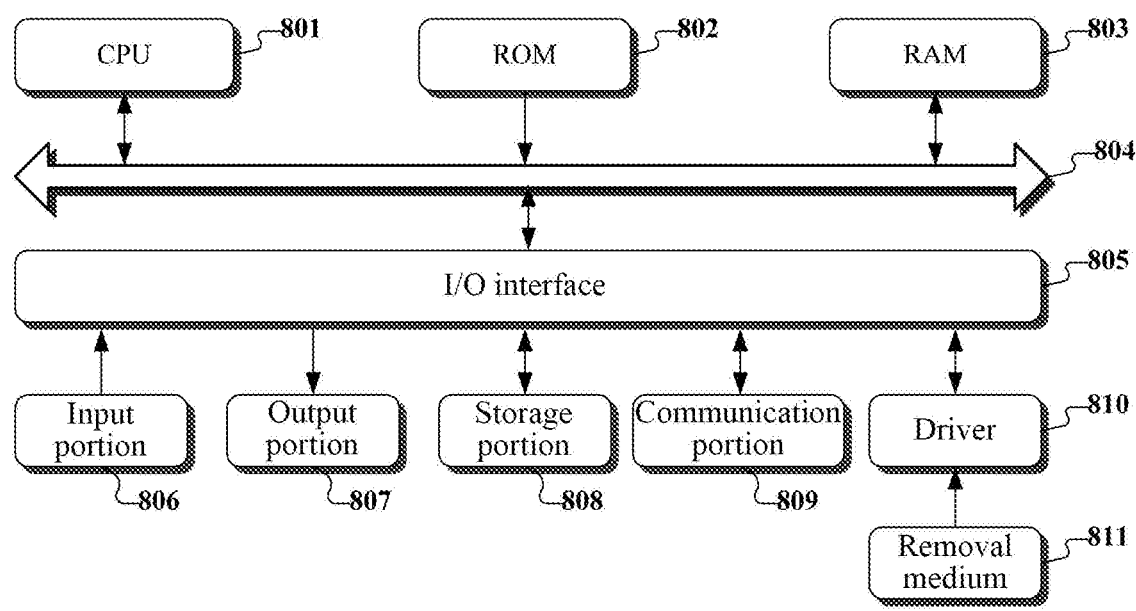
FIG. 8 is a schematic structural diagram of a computer system adapted to implement a terminal device according to an embodiment of the present disclosure.

Referring to FIG. 8, a schematic structural diagram of a computer system 800 adapted to implement an electronic device of some embodiments of the present disclosure is shown. The electronic device shown in FIG. 8 is merely an example, and should not limit the function and scope of use of some embodiments of the present disclosure.

As shown in FIG. 8, a computer system 800 includes a central processing unit (CPU) 801, which may execute various appropriate actions and processes in accordance with a program stored in a read-only memory (ROM) 802 or a program loaded into a random access memory (RAM) 803 from a storage portion 808. The RAM 803 also stores various programs and data required by operations of the system 800. The CPU 801, the ROM 802 and the RAM 803 are connected to each other through a bus 804. An input/output (I/O) interface 805 is also connected to the bus 804.

The following components are connected to the I/O interface 805: an input portion 806 including a keyboard or a mouse; an output portion 807 including a cathode ray tube (CRT), a liquid crystal display device (LCD) or a speaker; a storage portion 808 including a hard disk; and a communication portion 809 including a network interface card, such as an LAN card or a modem. The communication portion 809 performs communication processes via a network, such as the Internet. A driver 810 is also connected to the I/O interface 805 as required. A removable medium 811, such as a magnetic disk, an optical disk, a magneto-optical disk and a semiconductor memory, may be installed on the driver 810, so that a computer program read therefrom is installed on the storage portion 808 as needed.

In particular, according to embodiments of the present disclosure, the process described above with reference to the flowchart may be implemented in a computer software program. For example, an embodiment of the present disclosure includes a computer program product, which comprises a computer program that is tangibly embedded in a machine-readable medium. The computer program includes program codes for executing the method as illustrated in the flow chart. In such an embodiment, the computer program may be downloaded and installed from a network via the communication portion 809, and/or may be installed from the removable medium 811. The computer program, when executed by the CPU 801, implements the functions as defined by the methods of some embodiments of the present disclosure.

It should be noted that the computer readable medium in some embodiments of the present disclosure may be a computer readable signal medium or a computer readable storage medium or any combination of the above two. An example of the computer readable storage medium may include, but is not limited to: electric, magnetic, optical, electromagnetic, infrared, or semiconductor systems, apparatus, elements, or a combination of any of the above. A more specific example of the computer readable storage medium may include but is not limited to: an electrical connection with one or more wires, a portable computer disk, a hard disk, a random access memory (RAM), a read only memory (ROM), an erasable programmable read only memory (EPROM or flash memory), a fibre, a portable compact disk read only memory (CD-ROM), an optical memory, a magnet memory or any suitable combination of the above. In some embodiments of the present disclosure, the computer readable storage medium may be any tangible medium containing or storing programs which may be used by a command execution system, apparatus or element or incorporated thereto. In some embodiments of the present disclosure, the computer readable signal medium may include data signal in the base band or propagating as parts of a carrier, in which computer readable program codes are carried. The propagating data signal may take various forms, including but not limited to: an electromagnetic signal, an optical signal or any suitable combination of the above. The computer readable signal medium may be any computer readable medium except for the computer readable storage medium. The computer readable medium is capable of transmitting, propagating or transferring programs for use by, or used in combination with, a command execution system, apparatus or element. The program codes contained on the computer readable medium may be transmitted with any suitable medium including but not limited to: wireless, wired, optical cable and RF medium, or any suitable combination of the above.

A computer program code for executing operations in some embodiments of the present disclosure may be compiled using one or more programming languages or combinations thereof. The programming languages include object-oriented programming languages, such as Python, Java, Smalltalk or C++, and also include conventional procedural programming languages, such as "C" language or similar programming languages. The program code may be completely executed on a user's computer, partially executed on a user's computer, executed as a separate software package, partially executed on a user's computer and partially executed on a remote computer, or completely executed on a remote computer or server. In the circumstance involving a remote computer, the remote computer may be connected to a user's computer through any network, including a local area network (LAN) or a wide area network (WAN), or may be connected to an external computer (for example, connected through Internet using an Internet service provider).

The flowcharts and block diagrams in the accompanying drawings illustrate architectures, functions and operations that may be implemented according to the systems, methods and computer program products of the various embodiments of the present disclosure. In this regard, each of the blocks in the flowcharts or block diagrams may represent a module, a program segment, or a code portion, said module, program segment, or code portion comprising one or more executable instructions for implementing specified logic functions. It should also be noted that, in some alternative implementations, the functions denoted by the blocks may occur in a sequence different from the sequences shown in the figures. For example, any two blocks presented in succession may be executed, substantially in parallel, or they may sometimes be in a reverse sequence, depending on the function involved. It should also be noted that each block in the block diagrams and/or flowcharts as well as a combination of blocks may be implemented using a dedicated hardware-based system executing specified functions or operations, or by a combination of a dedicated hardware and computer instructions.

The units involved in some embodiments of the present disclosure may be implemented by means of software or hardware. The described units may also be provided in a processor, for example, described as: a processor including a first output unit, an acquisition unit, a recognition unit, a calculation unit, a determination unit and a second output unit, or described as a processor including a third output unit. In some cases, names of these units do not constitute the definition of the units themselves. For example, the first output unit may also be described as "a unit configured for outputting a to-be-read audio."

In another aspect, some embodiments of the present disclosure further provide a computer readable medium. The computer readable medium may be included in the terminal device in the above described embodiments, or a stand-alone computer readable medium not assembled into the terminal device. The computer readable medium stores one or more programs. The one or more programs, when executed by the terminal device, cause the terminal device to: output a to-be-read audio in response to receiving a reading instruction from a user; acquire an actually read audio obtained by reading the to-be-read audio by the user; perform speech recognition on the actually read audio to obtain a recognition result; calculate a similarity between the actually read audio and the to-be-read audio based on a character string corresponding to the recognition result and a character string corresponding to the to-be-read audio; determine, from a predetermined set of similarity intervals, a similarity interval to which the calculated similarity belongs; and output a reading evaluation corresponding to the determined similarity interval. Alternatively, the one or more programs cause the terminal device to: in response to receiving a reading instruction from a user, output a to-be-read audio sequence, and perform following reading steps for each to-be-read audio in the to-be-read audio sequence: outputting the to-be-read audio; acquiring an actually read audio obtained by reading the to-be-read audio by the user; performing speech recognition on the acquired actually read audio to obtain a recognition result; calculating a similarity between the acquired actually read audio and the to-be-read audio based on a character string corresponding to the recognition result and a character string corresponding to the to-be-read audio; determining, from a predetermined set of similarity intervals, a similarity interval to which the calculated similarity belongs; outputting a reading evaluation corresponding to the determined similarity interval; and in response to determining the calculated similarity being less than or equal to a preset similarity threshold, proceeding to perform the reading steps based on the to-be-read audio.

The above description only provides an explanation of embodiments of the present disclosure and the technical principles used. It should be appreciated by those skilled in the art that the inventive scope of the present disclosure is not limited to the technical solutions formed by the particular combinations of the above-described technical features. The inventive scope should also cover other technical solutions formed by any combinations of the above-described technical features or equivalent features thereof without departing from the concept of the disclosure. Technical schemes formed by the above-described features being interchanged with, but not limited to, technical features with similar functions disclosed in the present disclosure are examples.

What is claimed is:

1. A method for outputting information, comprising:
   outputting a to-be-read audio in response to receiving a reading instruction from a user;
   acquiring an actually read audio obtained by reading the to-be-read audio by the user;
   performing speech recognition on the actually read audio to obtain a recognition result;
   calculating a similarity between the actually read audio and the to-be-read audio based on a character string corresponding to the recognition result and a character string corresponding to the to-be-read audio;
   determining, from a predetermined set of similarity intervals, a similarity interval to which the calculated similarity belongs; and
   outputting a reading evaluation corresponding to the determined similarity interval.

2. The method according to claim 1, wherein the calculating the similarity between the actually read audio and the to-be-read audio based on the character string corresponding to the recognition result and the character string corresponding to the to-be-read audio comprises:
   in response to determining that the recognition result indicates the actually read audio being a Chinese audio and the to-be-read audio is an English audio or a Chinese audio, determining a phonetic character string corresponding to the to-be-read audio, and determining a phonetic character string corresponding to the recognition result; and
   calculating the similarity between the actually read audio and the to-be-read audio based on the phonetic character string corresponding to the to-be-read audio and the phonetic character string corresponding to the recognition result.

3. The method according to claim 1, wherein the calculating the similarity between the actually read audio and the to-be-read audio based on the character string corresponding to the recognition result and the character string corresponding to the to-be-read audio comprises:
   in response to determining that the recognition result indicates the actually read audio being an English audio and the to-be-read audio is a Chinese audio, determining a phonetic character string corresponding to the to-be-read audio, and determining an English character string corresponding to the recognition result; and
   calculating the similarity between the actually read audio and the to-be-read audio based on the phonetic character string corresponding to the to-be-read audio and the English character string corresponding to the recognition result.

4. The method according to claim 1, wherein the calculating the similarity between the actually read audio and the to-be-read audio based on the character string corresponding to the recognition result and the character string corresponding to the to-be-read audio comprises:
   in response to determining that the recognition result indicates the actually read audio being an English audio and the to-be-read audio is an English audio, determining an English character string corresponding to the to-be-read audio, and determining an English character string corresponding to the recognition result; and
   calculating the similarity between the actually read audio and the to-be-read audio based on the English character string corresponding to the to-be-read audio and the English character string corresponding to the recognition result.

5. The method according to claim 1, wherein the calculating the similarity between the actually read audio and the to-be-read audio based on the character string corresponding to the recognition result and the character string corresponding to the to-be-read audio comprises:
   determining a length of the longest common subsequence between the character string corresponding to the to-be-read audio and the character string corresponding to the recognition result; and
   calculating the similarity between the actually read audio and the to-be-read audio based on the length and a length of the character string corresponding to the to-be-read audio.

6. A method for outputting information, comprising:
   in response to receiving a reading instruction from a user, outputting a to-be-read audio sequence, and performing following reading steps for each to-be-read audio in the to-be-read audio sequence: outputting the to-be-read audio; acquiring an actually read audio obtained by reading the to-be-read audio by the user; performing speech recognition on the acquired actually read audio to obtain a recognition result; calculating a similarity between the acquired actually read audio and the to-be-read audio based on a character string corresponding to the recognition result and a character string corresponding to the to-be-read audio; determining, from a predetermined set of similarity intervals, a similarity interval to which the calculated similarity belongs; outputting a reading evaluation corresponding to the determined similarity interval; and in response to determining the calculated similarity being less than or equal to a preset similarity threshold, proceeding to perform the reading steps based on the to-be-read audio.

7. The method according to claim 6, further comprising:
in response to determining the calculated similarity being greater than the preset similarity threshold, proceeding to perform the reading steps based on a to-be-read audio next to the to-be-read audio in the to-be-read audio sequence.

8. An apparatus for outputting information, comprising:
at least one processor; and
a memory storing instructions, the instructions when executed by the at least one processor, cause the at least one processor to perform operations, the operations comprising:
outputting a to-be-read audio in response to receiving a reading instruction from a user;
acquiring an actually read audio obtained by reading the to-be-read audio by the user;
performing speech recognition on the actually read audio to obtain a recognition result;
calculating a similarity between the actually read audio and the to-be-read audio based on a character string corresponding to the recognition result and a character string corresponding to the to-be-read audio;
determining, from a predetermined set of similarity intervals, a similarity interval to which the calculated similarity belongs; and
outputting a reading evaluation corresponding to the determined similarity interval.

9. The apparatus according to claim 8, wherein the calculating the similarity between the actually read audio and the to-be-read audio based on the character string corresponding to the recognition result and the character string corresponding to the to-be-read audio comprises:
in response to determining that the recognition result indicates the actually read audio being a Chinese audio and the to-be-read audio is an English audio or a Chinese audio, determining a phonetic character string corresponding to the to-be-read audio, and determining a phonetic character string corresponding to the recognition result; and
calculating the similarity between the actually read audio and the to-be-read audio based on the phonetic character string corresponding to the to-be-read audio and the phonetic character string corresponding to the recognition result.

10. The apparatus according to claim 8, wherein the calculating the similarity between the actually read audio and the to-be-read audio based on the character string corresponding to the recognition result and the character string corresponding to the to-be-read audio comprises:
in response to determining that the recognition result indicates the actually read audio being an English audio and the to-be-read audio is a Chinese audio, determining a phonetic character string corresponding to the to-be-read audio, and determining an English character string corresponding to the recognition result; and
calculating the similarity between the actually read audio and the to-be-read audio based on the phonetic character string corresponding to the to-be-read audio and the English character string corresponding to the recognition result.

11. The apparatus according to claim 8, wherein the calculating the similarity between the actually read audio and the to-be-read audio based on the character string corresponding to the recognition result and the character string corresponding to the to-be-read audio comprises:
in response to determining that the recognition result indicates the actually read audio being an English audio and the to-be-read audio is an English audio, determining an English character string corresponding to the to-be-read audio, and determining an English character string corresponding to the recognition result; and
calculating the similarity between the actually read audio and the to-be-read audio based on the English character string corresponding to the to-be-read audio and the English character string corresponding to the recognition result.

12. The apparatus according to claim 8, wherein the calculating the similarity between the actually read audio and the to-be-read audio based on the character string corresponding to the recognition result and the character string corresponding to the to-be-read audio comprises:
determining a length of the longest common subsequence between the character string corresponding to the to-be-read audio and the character string corresponding to the recognition result; and
calculating the similarity between the actual read-after audio and the to-be-read audio based on the length and a length of the character string corresponding to the to-be-read audio.

13. An apparatus for outputting information, comprising:
at least one processor; and
a memory storing instructions, the instructions when executed by the at least one processor, cause the at least one processor to perform operations, the operations comprising:
outputting a to-be-read audio sequence in response to receiving a reading instruction from a user, and executing following reading steps for each to-be-read audio in the to-be-read audio sequence: outputting the to-be-read audio; acquiring an actually read audio obtained by reading the to-be-read audio by the user; performing speech recognition on the acquired actually read audio to obtain a recognition result; calculating a similarity between the acquired actually read audio and the to-be-read audio based on a character string corresponding to the recognition result and a character string corresponding to the to-be-read audio; determining, from a predetermined set of similarity intervals, a similarity interval to which the calculated similarity belongs; outputting a reading evaluation corresponding to the determined similarity interval; and
in response to determining the calculated similarity being less than or equal to a preset similarity threshold, proceeding to perform the reading steps based on the to-be-read audio.

14. The apparatus according to claim 13, the operations further comprising:
in response to determining the calculated similarity being greater than the preset similarity threshold, proceeding to perform the reading steps based on a to-be-read audio next to the to-be-read audio in the to-be-read audio sequence.

15. A non-transitory computer readable medium, storing a computer program, wherein the program, when executed by a processor, implements a method comprising:
- outputting a to-be-read audio in response to receiving a reading instruction from a user;
- acquiring an actually read audio obtained by reading the to-be-read audio by the user;
- performing speech recognition on the actually read audio to obtain a recognition result;
- calculating a similarity between the actually read audio and the to-be-read audio based on a character string corresponding to the recognition result and a character string corresponding to the to-be-read audio;
- determining, from a predetermined set of similarity intervals, a similarity interval to which the calculated similarity belongs; and
- outputting a reading evaluation corresponding to the determined similarity interval.

* * * * *

UNITED STATES PATENT AND TRADEMARK OFFICE
CERTIFICATE OF CORRECTION

PATENT NO. : 11,132,996 B2  
APPLICATION NO. : 16/593678  
DATED : September 28, 2021  
INVENTOR(S) : Lu Page 1 of 1

It is certified that error appears in the above-identified patent and that said Letters Patent is hereby corrected as shown below:

On the Title Page

Item (73) ASSIGNEE(S):
"BAIDU ONLINE NETWORK TECHNOLOGY (BEIJING) CO., LTD., Beijing (CN)" should read:
--BAIDU ONLINE NETWORK TECHNOLOGY (BEIJING) CO., LTD., Beijing (CN); SHANGHAI XIAODU TECHNOLOGY CO. LTD., Shanghai (CN)--.

Signed and Sealed this  
Ninth Day of May, 2023

Katherine Kelly Vidal  
*Director of the United States Patent and Trademark Office*